(12) United States Patent
Yamaguchi

(10) Patent No.: US 11,868,578 B2
(45) Date of Patent: Jan. 9, 2024

(54) DETECTOR

(71) Applicant: KABUSHIKI KAISHA TOKAI RIKA DENKI SEISAKUSHO, Aichi (JP)

(72) Inventor: Syogo Yamaguchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/049,631

(22) Filed: Oct. 26, 2022

(65) Prior Publication Data

US 2023/0134518 A1 May 4, 2023

(30) Foreign Application Priority Data

Oct. 28, 2021 (JP) .................................. 2021-176575

(51) Int. Cl.
*G06F 3/044* (2006.01)

(52) U.S. Cl.
CPC .......... *G06F 3/0447* (2019.05); *G06F 3/0443* (2019.05); *G06F 3/0446* (2019.05)

(58) Field of Classification Search
CPC ..... G06F 3/0447; G06F 3/0443; G06F 3/0446
See application file for complete search history.

(56) References Cited

U.S. PATENT DOCUMENTS

| | | | | |
|---|---|---|---|---|
| 2009/0164062 A1* | 6/2009 | Aoki | .................... | B60Q 1/0082 701/36 |
| 2011/0088838 A1* | 4/2011 | Thompson | ............ | B29C 66/944 156/273.3 |
| 2011/0310038 A1* | 12/2011 | Park | ...................... | G06F 3/0446 345/173 |
| 2016/0170561 A1 | 6/2016 | Kakinuma | | |
| 2017/0185229 A1 | 6/2017 | Kakinuma | | |

FOREIGN PATENT DOCUMENTS

JP 2016115011 A 6/2016

* cited by examiner

*Primary Examiner* — Patrick N Edouard
*Assistant Examiner* — Joseph P Fox

(57) ABSTRACT

A detector includes a frame that is at least partially formed from metal, electrodes arranged in a coordinate planar direction of an operating surface, the operating surface being at least partially in contact with the frame, the electrodes detecting a user operation that is an approach or contact of a body of a user toward or with the operating surface, and a calculator that obtains a calculation coordinate by calculating an operation position of the user operation on the operating surface based on an electrostatic capacity change in each of the electrodes. The operating surface is divided into areas. The calculator converts the calculation coordinate to a correction coordinate shifted from a boundary of one of the areas toward an inner portion of one of the electrodes in which the electrostatic capacity change is larger than other electrodes, thereby determining that the correction coordinate is the operation position.

4 Claims, 5 Drawing Sheets

DETECTOR

BACKGROUND

1. Field

The following description relates to a detector that detects a user operation in accordance with a change in the electrostatic capacity of each electrode.

2. Description of Related Art

Japanese Laid-Open Patent Publication No. 2016-115011 discloses a detector that uses an electrostatic sensor of an electrostatic capacitive type to detect a touching operation performed on a touchpad. The detector disclosed in the above publication detects, for example, a trace of a finger moving in contact with an operating surface of the touchpad as a coordinate movement. Thus, the touching operation is detected on the operating surface of the touchpad.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The touchpad may be decorated with, for example, plating that surrounds the touchpad. In this case, when a touching operation is performed on the touchpad, if a human body touches a plated portion, the electrostatic capacity of an electrode may be changed by metal in the plated portion. This may result in an incorrect detection of the touching operation.

An aspect of a detector includes a frame that is at least partially formed from metal, electrodes arranged in a coordinate planar direction of an operating surface, the operating surface being at least partially in contact with the frame, the electrodes detecting a user operation that is an approach or contact of a body of a user toward or with the operating surface, and a calculator that obtains a calculation coordinate by calculating an operation position of the user operation on the operating surface based on an electrostatic capacity change in each of the electrodes. The operating surface is divided into areas. The calculator converts the calculation coordinate to a correction coordinate that is shifted from a boundary of one of the areas toward an inner portion of one of the electrodes in which the electrostatic capacity change is larger than in a remaining one of the electrodes, thereby determining that the correction coordinate is the operation position of the user operation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a detector 1 will now be described.

General Structure of Detector 1

Figure 1:
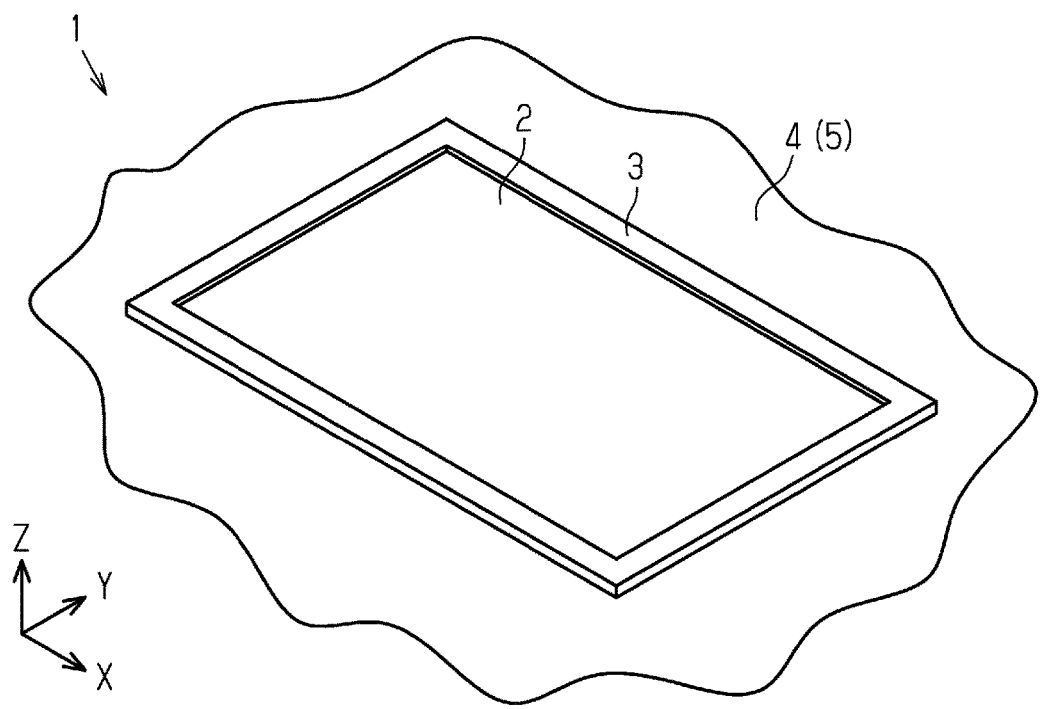
FIG. 1 is a perspective view showing the outer appearance of a detector.

As shown in FIG. 1, the detector 1 includes an operating surface 2 that is operated by a user and a frame 3 that is at least partially formed from metal. At least a portion of the operating surface 2 is in contact with the frame 3. The detector 1 is a touch detector that detects a user operation that is an approach or contact of the body of a user toward or with the operating surface 2. An example of the detector 1 is a touchpad. An example of an installation location 4 of the detector 1 is the inside of a vehicle. In this case, the installation location 4 may be, for example, a steering wheel 5. However, the installation location 4 is not limited to a steering wheel 5 and may be a handle or other members. The operating surface 2 has an X-Y plane in which an x-axis and a y-axis are orthogonal to each other and served as coordinate axes. The operating surface 2 is, for example, planar.

The frame 3 is, for example, decorated with plating. The plating is applied to, for example, the surface of the frame 3. The frame 3 is annular. More specifically, the frame 3 is shaped to surround the operating surface 2 without any gap. The frame 3 has, for example, a quadrangular annular shape.

Figure 2:
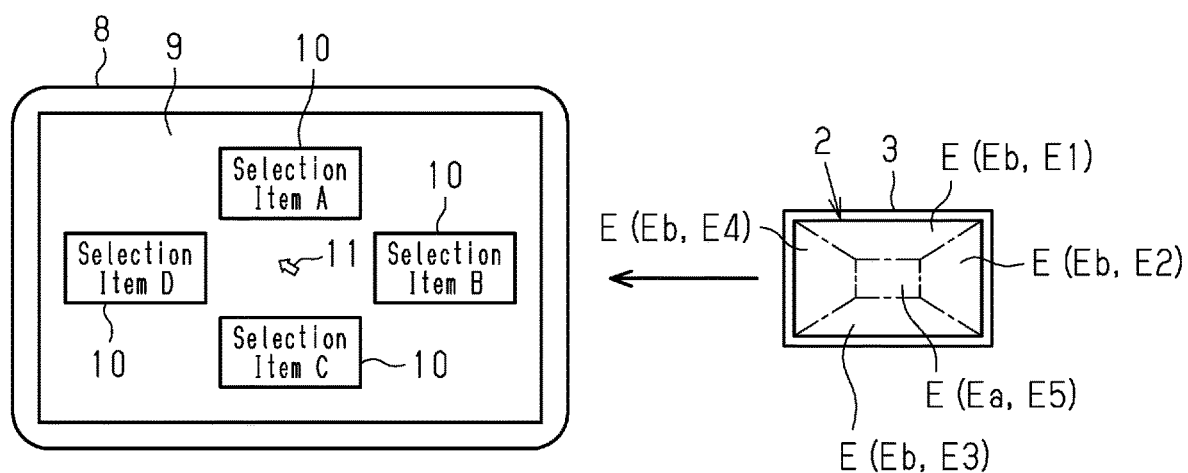
FIG. 2 is a diagram showing the relationship between areas of an operating surface and selection items shown on a screen.

As shown in FIG. 2, the detector 1 detects an input operation for selecting one of selection items 10 shown on a screen 9 of a display 8. In the example shown in FIG. 2, the operating mode of the operating surface 2 is a cross-shaped button (cross-shaped key) that is operated in cross-shaped directions. When the user operation is performed on the operating surface 2 in one of the cross-shaped directions, one of the selection items 10 shown in the display 8 is selected. When the user operation is performed on the operating surface 2, a cursor 11 shown in the display 8 moves to the position selected by the user operation. Examples of the display 8 include a multi-information display installed in an instrument panel or a display of an automotive navigation device located inside a vehicle.

The operating surface 2 includes areas E separated from each other. The selection items 10 are respectively associated with the areas E. The areas E include a central area Ea disposed in a central position of the operating surface 2 and operating areas Eb arranged so as to surround the central area Ea. In other words, the operating areas Eb are arranged along the periphery of the central area Ea. In the example shown in FIG. 2, the four operating areas Eb are defined as a first area E1, a second area E2, a third area E3, and a fourth area E4. The central area Ea is defined as a fifth area E5. As describe above, in one example, the areas E include the first area E1, the second area E2, the third area E3, the fourth area E4, and the fifth area E5.

In the example shown in FIG. 2, the first to fourth areas E1, E2, E3, and E4 are respectively associated with selection items A, B, C, and D shown in the display 8. The fifth area E5 is associated with a region of the display 8 that does not include the selection items 10, for example, a central region of the display 8 (screen 9). The fifth area E5 is associated with a home position of the display 8 from which any of the selection items A to D is not selected.

Electrical Configuration of Detector 1

Figure 3:
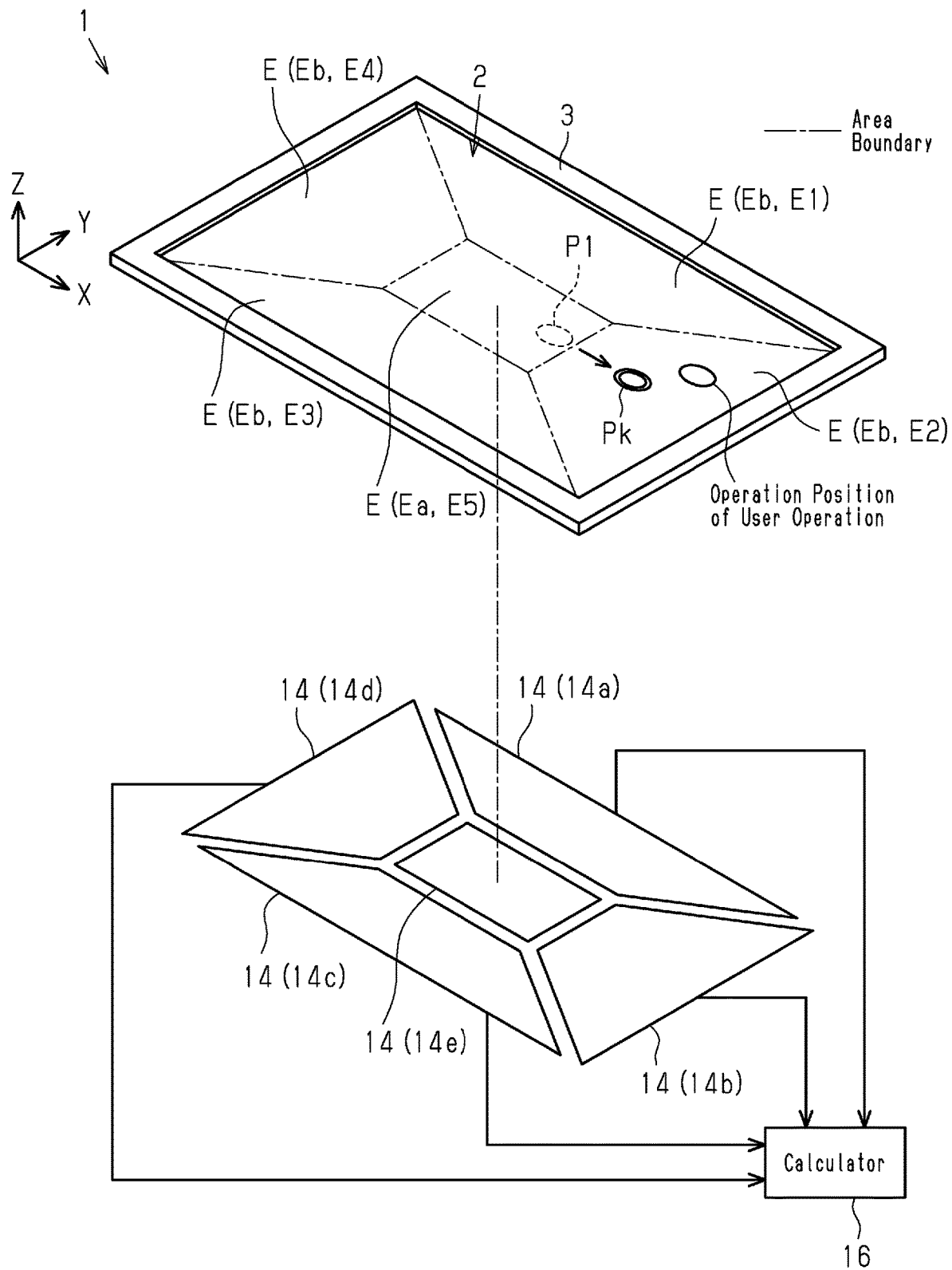
FIG. 3 is an exploded perspective view of a detector that includes the operating surface and electrodes.

As shown in FIG. 3, the detector 1 includes electrodes 14 arranged to detect a user operation performed on the operating surface 2. In an example, the detector 1 is a resistive film-type device on which planar electrodes 14 are arranged. The electrodes 14 are arranged in a coordinate planar direction (X-Y planar direction shown in FIG. 3) of the operating surface 2. The electrodes 14 are arranged respectively corresponding to the areas E of the operating surface 2. In the example shown in FIG. 3, the electrodes 14 include the first electrode 14a corresponding to the first area E1, the second electrode 14b corresponding to the second area E2, the third electrode 14c corresponding to the third area E3, the fourth electrode 14d corresponding to the fourth area E4, and the fifth electrode 14e corresponding to the fifth area E5.

The first electrode 14a is disposed under the first area E1 of the operating surface 2 and is similar in shape to the first area E1. In other words, the first area E1 corresponds to the shape of the first electrode 14a. The first electrode 14a is trapezoidal. The second electrode 14b, the third electrode 14c, and the fourth electrode 14d are also similar in shape to the first electrode 14a. The fifth electrode 14e is disposed under the fifth area E5 and quadrangular.

The detector 1 includes a calculator 16. When a user operation is performed on the operating surface 2, the calculator 16 calculates an operation position (operation coordinates) of the user operation performed on the operating surface 2 based on changes in the electrostatic capacity of each electrode 14. The calculator 16 calculates which one of the areas E of the operating surface 2 is operated by the user based on the electrostatic capacity changes in the electrodes 14. In an example, the calculator 16 assigns an electrostatic capacity detected in each electrode 14 to a specified operational expression and calculates operation coordinates to obtain the operation position of the user operation.

Correction of Touching Operation Position

As shown in FIG. 3, when the operating surface 2 is divided into the areas E and calculation coordinates P1 are obtained by calculation based on the electrostatic capacity changes, the calculator 16 converts the calculation coordinates P1 into correction coordinates Pk, which are separated from the boundary of the corresponding area. Thus, the correction coordinates Pk are considered as the operation position of the user operation. In some embodiments, the correction coordinates Pk are obtained by shifting the calculation coordinates P1 toward an inner portion of one of the electrodes 14 in which the electrostatic capacity change is larger than in a remaining one of the electrodes 14. In the example shown in FIG. 3, the calculator 16 corrects the calculation coordinates P1 by a coordinate conversion that shifts the calculation coordinates P1 toward the center position of the area E in which the user operation is performed.

The operation of the detector 1 will now be described.

Calculation of Operation Position (Touch Position)

Figure 4:
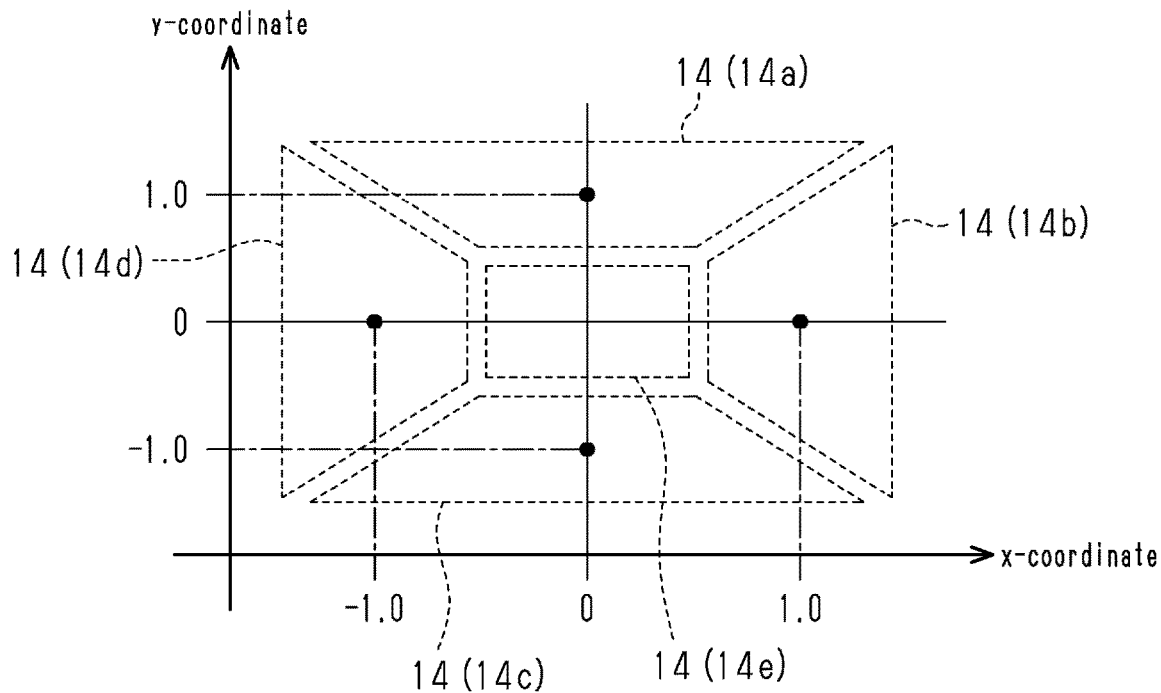
FIG. 4 is a coordinate diagram showing the relationship between the arrangement of the electrodes in the detector and a coordinate system of the operating surface.

FIG. 4 shows the relationship between the arrangement of the electrodes in the detector 1 and the coordinate system of the operating surface 2. As shown in FIGS. 3 and 4, when the operating surface 2 is touched, the calculator 16 calculates the calculation coordinates P1 of the touched position based on the electrostatic capacity detected from each of the first to fifth electrodes 14a to 14e. The calculation coordinates P1 may be calculated, for example, based on the center of mass of each area E. In this case, the calculation coordinates P1 (x,y) are calculated by a first operational expression K1 and a second operational expression K2 shown below. In the first operational expression K1 and the second operational expression K2, "$\Delta C_n$" is a difference value of the electrostatic capacity of an electrode n, "$a_n$" is an X-coordinate calculation coefficient of the electrode n, and "$b_n$" is a Y-coordinate calculation coefficient of the electrode n, where "n" is a natural number that specifies each electrode 14. In the example shown in FIG. 4, the first to fifth electrodes 14a to 14e correspond to n=1 to 5, respectively.

Expression 1

$$x = \frac{\sum_{n=1}^{5} a_n \Delta C_n}{\sum_{n=1}^{5} \Delta C_n} \quad \text{K1}$$

$$y = \frac{\sum_{n=1}^{5} b_n \Delta C_n}{\sum_{n=1}^{5} \Delta C_n} \quad \text{K2}$$

In an example, "$a_n$" may be 0 when n=1, 3, and 5, may be 1 when n=2, and may be −1 when n=4. Thus, the first operational expression K1 weights the electrostatic capacity change in accordance with the position of each of the electrodes 14 in the x-axis direction on the X-Y plane. In an example, "$b_n$" may be zero when n=2, 4, and 5, may be 1 when n=1, and may be −1 when n=3. Thus, the second operational expression K2 weights the electrostatic capacity change in accordance with the position of each of the electrodes 14 in the y-axis direction on the X-Y plane.

Correction of Calculation Coordinate P1

Figure 5:
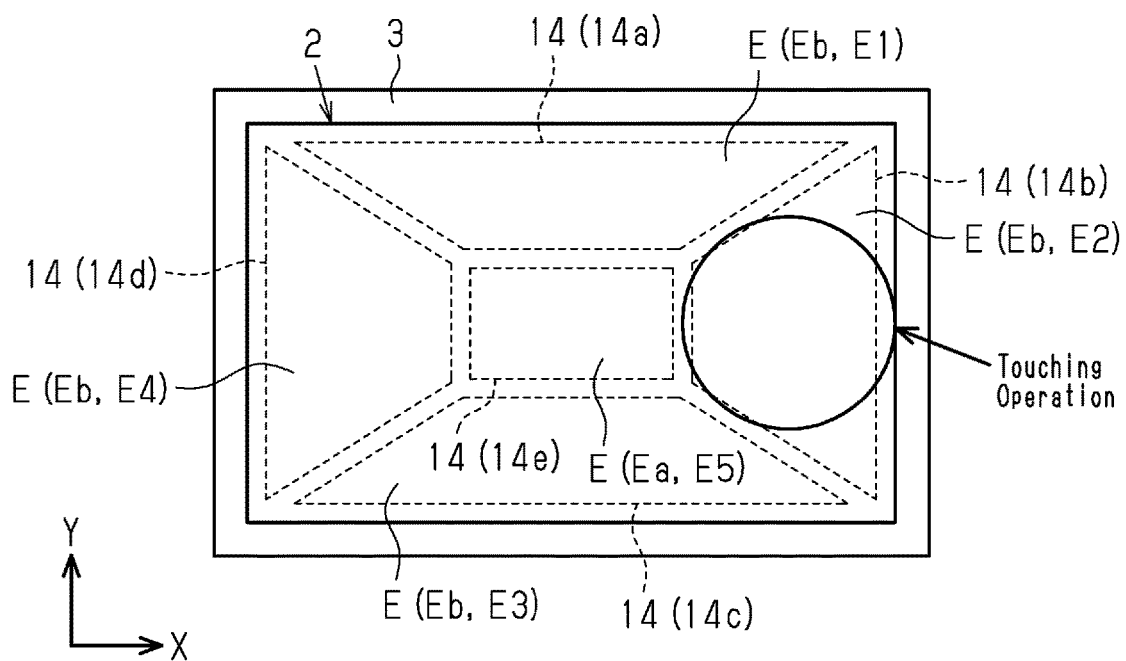
FIG. 5 is a schematic diagram when a touching operation is performed on the operating surface.

As shown in FIG. 5, for example, the user may touch the second area E2 of the operating surface 2. In the case shown in FIG. 5, it is assumed that only the second area E2 is touched. That is, the other areas E are not touched. When only the second area E2 is touched, the electrostatic capacity is expected to change only in the second electrode 14b.

Figure 6:
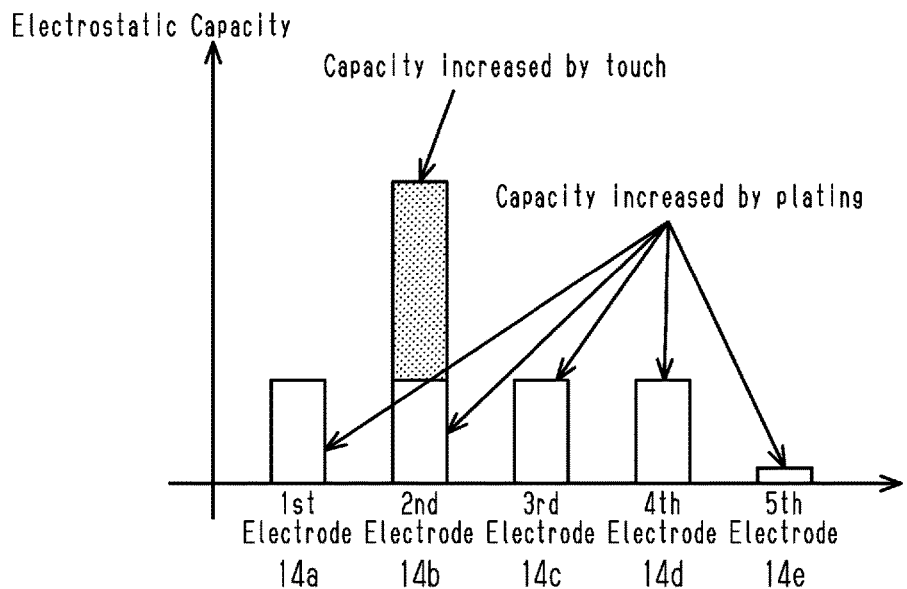
FIG. 6 is a graph showing changes in electrostatic capacity of each electrode.

However, as shown in FIG. 6, even when the user touches only the second area E2, the electrostatic capacity changes in the other electrodes 14, which are not touched by the user, because of the frame 3 (plating, that is, metal) surrounding the operating surface 2. In the case of the example shown in FIG. 6, although the second area E2 is touched, the electrostatic capacity changes in the first electrode 14a, the third electrode 14c, the fourth electrode 14d, and the fifth electrode 14e due to the effect of the frame 3. That is, when the electrostatic capacity is increased in the second electrode 14b by the touching operation, the electrostatic capacity is also increased in the other electrodes 14 by the frame 3.

Figure 7:
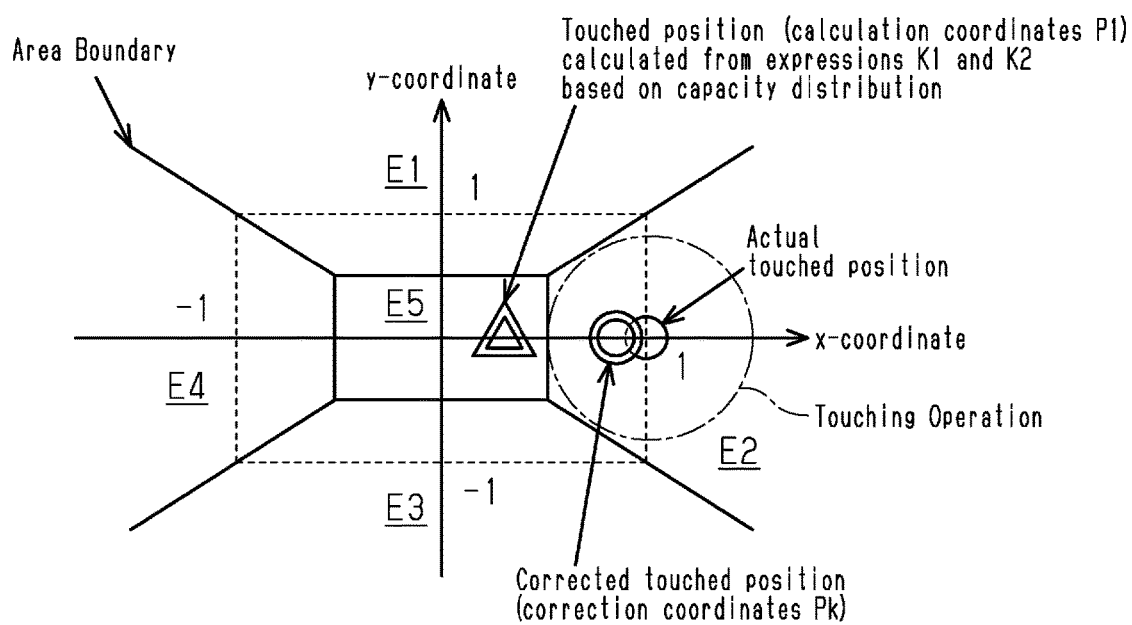
FIG. 7 is a coordinate diagram showing an example of conversion of calculation coordinates into correction coordinates.

Consequently, as shown in FIG. 7, when a touching operation is performed, the calculation coordinates P1 of a touched position obtained from the calculation may fail to indicate the coordinates of the actual touched position and may indicate coordinates of a different position. In the case of the example shown in FIG. 7, although the touching operation is performed on the second area E2, the calculation coordinates P1 indicate coordinates of a touched position in the fifth area E5. As described above, the touched position may be erroneously detected.

Figure 8:
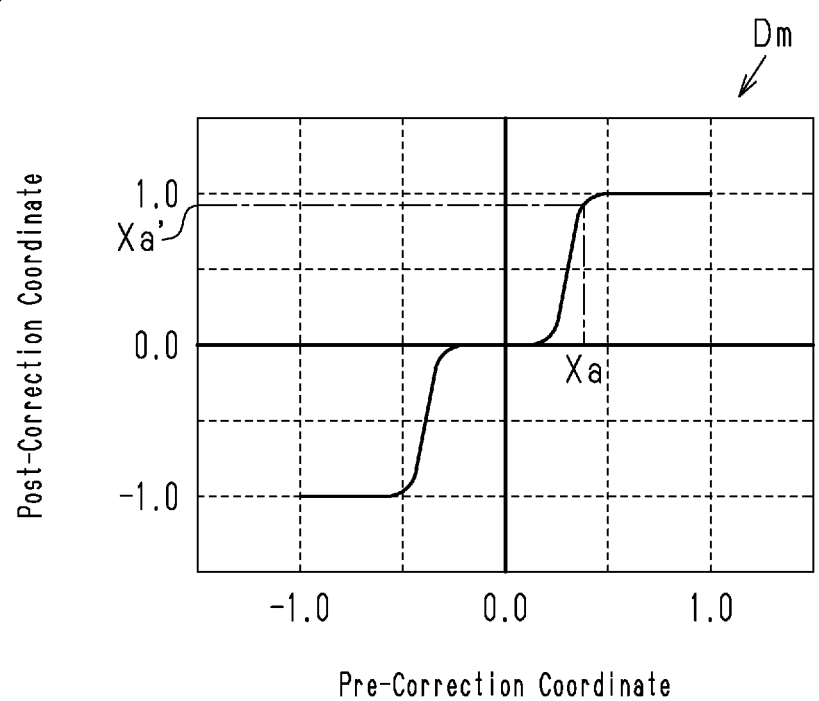
FIG. 8 is a graph showing an example of conversion information.

In this regard, as shown in FIG. 8, the calculator 16 executes a coordinate conversion that shifts the calculation coordinates P1, which are calculated from the first operational expression K1 and the second operational expression K2, toward the center position of the area E in which the user operation is actually performed (in the example shown in FIG. 7, the second area E2). Thus, the calculation coordinates P1 are corrected to the correction coordinates Pk. In the example shown in FIG. 8, the calculator 16 converts the calculation coordinates P1 into the correction coordinates Pk with reference to conversion information Dm showing the correspondence relationship between pre-correction coordinates and post-correction coordinates. The conversion information Dm may be, for example, any of a map and a conversion equation.

In an example, the calculator 16 corrects each of the x-coordinate and the y-coordinate of the calculation coordinates P1 using the conversion information Dm. For example, as shown in FIG. 7, when the x-coordinate of the calculation coordinates P1 is denoted by Xa, the conversion information Dm (refer to FIG. 8) converts the x-coordinate Xa to an x-coordinate Xa', which is close to the position where the user operation is performed (actual touched position shown in FIG. 7). In the same manner, the y-coordinate of the calculation coordinates P1 is corrected in accordance with the conversion information Dm. The calculator 16 sets the correction coordinates Pk (x,y) to the operation position of the user operation.

The detector 1 locates the cursor 11 on the position of the screen 9 corresponding to the correction coordinates Pk (x,y). When the cursor 11 corresponding to the correction coordinates Pk (x,y) is located on a selection item 10 (selection items A to D) of the screen 9, the detector 1 determines to select the selection item 10. As described above, the selection item 10 corresponding to the user operation (touching operation) performed on the operating surface 2 is accurately selected as the selected subject from the selection items 10 shown in the screen 9.

The detector 1 of the embodiment has the advantages described below.
  (1) The detector 1 includes the frame 3, the electrodes 14, and the calculator 16. At least a portion of the frame 3 is formed from metal. The electrodes 14 detect a user operation that is an approach or contact of the body of a user toward or with the operating surface 2, which is at least partially in contact with the frame 3. The calculator 16 obtains the calculation coordinates P1 by calculating the operation position of the user operation performed on the operating surface 2 based on changes in the electrostatic capacity of the electrodes 14. The electrodes 14 are arranged in the coordinate planar direction of the operating surface 2 surrounded by the frame 3. The operating surface 2 is divided into the areas E. The calculator 16 converts the calculation coordinates P1 into correction coordinates Pk, which are shifted from the boundary of the corresponding area toward an inner portion of one of the electrodes 14 (in the example shown in FIG. 3, electrode 14b) in which the electrostatic capacity change is larger than in a remaining one of the electrodes 14. Thus, the correction coordinates Pk determine the operation position of the user operation.

With this structure, when a user performs a user operation such that the body of the user contacts or approaches the operating surface 2, the calculation coordinates P1 differing from the actual operation position may be obtained due to the effect of the frame 3 surrounding the operating surface 2. Even in such a case, the calculation coordinates P1 are converted into the correction coordinates Pk to detect the user operation. Thus, the calculation coordinates P1, which are affected by the frame 3, are not calculated as the operation position, and a position close to the actual operation position of the user operation is calculated as the operation position. This increases the detection accuracy of the user operation.

(2) The calculator 16 determines which one of the areas E on the operating surface 2 is operated by the user. With this structure, among the areas E on the operating surface 2, the area E that is operated by the user is accurately detected.

(3) The operating surface 2 has the X-Y plane in which the x-axis and the y-axis are orthogonal to each other and served as coordinate axes. The calculator 16 obtains an x-coordinate of the calculation coordinates P1 from the first operational expression K1, which weights the electrostatic capacity change in accordance with the position of each of the electrodes 14 in the x-axis direction on the X-Y plane. Also, the calculator 16 obtains a y-coordinate of the calculation coordinates P1 from the second operational expression K2, which weights the electrostatic capacity change in accordance with the position of each of the electrodes 14 in the y-axis direction on the X-Y plane. With this structure, when the calculation coordinates P1 are obtained from the first operational expression K1 and the second operational expression K2, even if the obtained coordinate position differs from the actual operation position due to the effect of the frame 3 surrounding the operating surface 2, the coordinate position will be corrected. Thus, the calculation coordinates P1 (X,Y) are obtained using a conventional calculation process and corrected to coordinates close to the actual position of the user operation.

(4) The calculator 16 calculates the correction coordinates Pk by a coordinate conversion that shifts the calculation coordinates P1 toward the center position of the area E in which the user operation is performed. With this structure, the calculation coordinates P1 are corrected toward the center position of the area E. Thus, the calculation coordinates P1 are shifted to a position at which the areas are clearly separated. This further improves the accuracy of detecting the position of a user operation.

(5) The areas E include the central area Ea disposed in the center position of the operating surface 2 and the operating areas Eb arranged so as to surround the central area Ea. With this structure, the operating surface 2 may be a cross-shaped button type switch that is operated in four directions, that is, upward, downward, leftward, and rightward.

(6) The frame 3 is annular. With this structure, the calculation coordinates P1 are corrected to obtain the operation position of a user operation. Thus, while the appearance is improved by the annular shape of the frame 3 surrounding the operating surface 2, the accuracy of detecting the user operation is not lowered by the frame 3.

MODIFIED EXAMPLES

The embodiment may be modified as follows. The embodiments and the following modified examples can be combined as long as the combined modified examples remain technically consistent with each other.

The shape of the frame 3 is not limited to an annular shape and may include, for example, a partial slit.

The frame 3 may only partially surround the operating surface 2. More specifically, the frame 3 may have any shape as long as the frame 3 is in contact with a portion of the operating surface 2. In an example, the frame 3 may be V-shaped and have an end portion that is in contact with the operating surface 2.

The frame 3 is not limited to a frame that is entirely formed from metal. For example, the frame 3 may be a resin frame that is decorated with plating. Thus, at least a portion of the frame 3 may be formed from metal.

The shifted position (i.e., the correction coordinates Pk) of the calculation coordinates P1 is not limited to the center position (the vicinity of the center) of the area E. For example, the shifted position may be any position where the position is clearly determined such as the edge of the area E.

The detector 1 is not limited to a device that determines an area. The detector 1 may be, for example, a device that determines an operation position of a user operation in the area, that is, operation coordinates specifying the operation position.

The detector 1 (operation detector) is not limited to a touchpad and may be, for example, a touch panel.

The detector 1 is not limited to a vehicle on-board detector and may be used for other devices or systems.

The calculator 16 may include [1] one or more processors that operate in accordance with computer programs (software) or [2] a combination of such processors and one or more dedicated hardware circuits that execute at least some of various processes such as application specific integrated circuits (ASICs). The processor includes a CPU and memory such as RAM and ROM. The memory stores program codes or instructions configured to cause the CPU to execute processes. The memory (computer readable medium) includes any type of medium that is accessible by a general-purpose computer or a dedicated computer. Alternatively, processing circuitry that includes one or more dedicated hardware circuits may be used to execute all of the various processes instead of using a computer including the above processors.

The calculator 16 may include a separate processor or a shared processor the functions of which are partially shared. Thus, the calculator 16 is not limited to a separate functional block and may include a single function block or partially-shared function blocks.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A detector comprising:
a frame that is at least partially formed from metal;
electrodes arranged in a coordinate planar direction of an operating surface, the operating surface being at least partially in contact with the frame, the electrodes detecting a user operation that is an approach or contact of a body of a user toward or with the operating surface; and
a calculator that obtains a calculation coordinate by calculating an operation position of the user operation on the operating surface based on an electrostatic capacity change in each of the electrodes, wherein
the operating surface is divided into areas,
the calculator determines in which one of the areas on the operating surface the user operation is performed, and
the calculator converts the calculation coordinate to a correction coordinate by shifting the calculation coordinate toward a center position of one of the areas including one of the electrodes in which the electrostatic capacity change is the largest, thereby determining that the correction coordinate is an operation position of the user operation.

2. The detector according to claim 1, wherein
the operating surface has an X-Y plane in which an x-axis and a y-axis are orthogonal to each other and served as coordinate axes,
the calculator obtains an x-coordinate of the calculation coordinate from a first operational expression, the first operational expression weighting the electrostatic capacity change in accordance with a position of each of the electrodes in an x-axis direction on the X-Y plane, and
the calculator obtains a y-coordinate of the calculation coordinate from a second operational expression, the second operational expression weighting the electrostatic capacity change in accordance with a position of each of the electrodes in a y-axis direction on the X-Y plane.

3. The detector according to claim 1, wherein the areas include a central area disposed in a center position of the operating surface and operating areas arranged so as to surround the central area.

4. The detector according to claim 1, wherein the frame has a continuous shape.

* * * * *